J. M. Hicks.
Bee Hive.
No. 107,047. Patented Sep. 6, 1870.
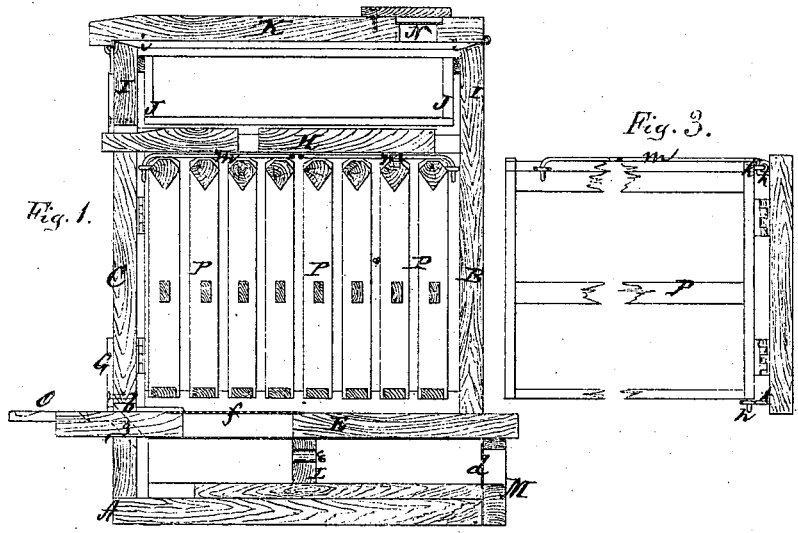
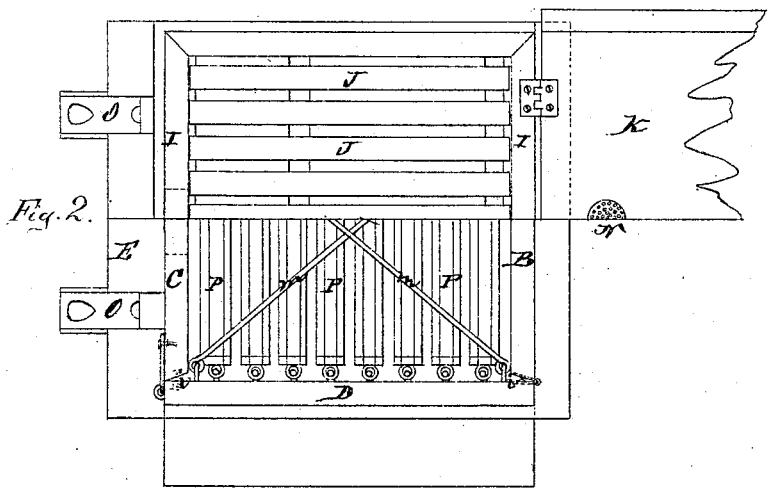
Witnesses:
Chas. Jacobs
J. V. White
Inventor:
J. M. Hicks.
Per
T. M. Alexander
Atty.

United States Patent Office.

JOSEPH M. HICKS, OF INDIANAPOLIS, INDIANA.

Letters Patent No. 107,047, dated September 6, 1870.

IMPROVEMENT IN BEE-HIVES.

The Schedule referred to in these Letters Patent and making part of the same.

*To all whom it may concern:*

Be it known that I, JOSEPH M. HICKS, of Indianapolis, in the county of Marion and State of Indiana, have invented certain and and useful Improvements in Bee-Hives; and I do hereby declare that the following is a full, clear, and exact description thereof, reference being had to the accompanying drawings and to the letters of reference marked thereon which form a part of this specification.

The nature of my invention consists in the construction and arrangement of a "bee-hive," as will be hereinafter set forth.

In order to enable others skilled in the art to which my invention appertains to make and use the same, I will now proceed to describe its construction and operation, referring to the annexed drawings, in which—

Figure 1 is a longitudinal vertical section, and
Figure 2, a plan view, part in section, of my hive.
Figure 3 is a side view of the comb-frames.

A represents the base of the hive, upon which is placed the hive proper, consisting of two sides, B B, joined together at the corners, and two hinged doors, C and D, forming the other two sides of the hive, these doors being hinged one to each of the sides B, and, when closed, their outer edges join and are fastened by a hook, a, as shown in fig. 2.

The top E of the base A forms the bottom of the hive proper, and extends outward a suitable distance on the front side to form the customary alighting-board, under the entrance b, which is closed by a pivoted door, G.

The top H of the hive proper is provided with two openings running across the hive, and leading into the box I above, in which the hony-frames J J are placed, said box being closed by the hinged cover K.

In the base A is placed a drawer, M, for the moth-miller.

It is admitted by all bee-keepers that a bee-hive should have an east front, which theory I believe to be correct.

I give the moth-miller drawer M a west front, because the moth-miller always attacks bee-hives late in the afternoon and evening, continuing their attacks through the night.

The drawer M has a screen, d, on the side directly opposite to where the bees and moth-miller enter the hive.

This drawer is also used for the purpose of catching the droppings of the bees at one end, it having a partition, L, with passage e, as shown in fig. 2, thereby cleaning the hive at once of all filth, and also of destroying the moth-millers.

In the bottom E of the hive is an opening, also with a screen, to let the droppings fall down into the drawer.

The screen d, on the front of said drawer, is also useful for the purpose of ventilating the hive in connection with the ventilator N on top of hive.

This ventilator consists of a piece of perforated tin or metal of any kind, or wire-cloth sunk in the lid K on the top side, in order to keep the bees from waxing it over, which they would do if put on the under side.

This feature is very useful and important in all hives, so as to prevent bees from closing up with wax any ventilation that may be desired.

In the alighting-board E, on each side of the bee-entrance b, is a slide, O, of wood or metal, with a passage, g, through the board E, into the drawer M.

These slides can be adjusted to such a degree as to admit of all sizes of bees, either drones or worker-bees, so that when robbers attack one of these hives, they can be trapped at pleasure and held as prisoners.

All the edges of this hive are beveled, as shown at points marked i, so as to prevent the killing of bees when the top lid K or either of the doors C and D are closed.

The comb-frames P P are hung on the door D by means of hooks h and eye-screws k, as shown in fig. 3, so that the frames may be swung with the bees and honey out of the hive.

The frames P P are also braced with wires m m, or strips of leather or wood, so arranged as to brace from or near the corners of the door or side D, crossing each other on top of the frames, and attached near the outer ends of the side frames; or they may also be braced from or near the center of the door to the corner of the frame.

Having thus fully described my invention,

What I claim as new, and desire to secure by Letters Patent, is—

1. The frames P P, hinged to the door of the hive and secured by braces m m, all arranged as and for the purpose set forth.

2. So beveling the top of the hive or sides thereof, where the doors are hinged, that the bees will not be injured by the shutting down of the top or the closing of the doors, substantially as described.

3. A bee-hive, consisting of base A, drawer M, top E, sides B B, doors C D, slides O O, frames P P, top H, frames J J, and cover K, all arranged substantially as set forth.

In testimony that I claim the foregoing as my own, I affix our signature in presence of two witnesses.

JOSEPH M. HICKS.

Witnesses:
JAMES H. FISHER,
J. A. DELANO.